United States Patent
Walker et al.

(10) Patent No.: US 10,984,436 B1
(45) Date of Patent: *Apr. 20, 2021

(54) SYSTEM INCLUDING POINT-OF-SALE (POS) TERMINAL FOR REDEMPTION OF A BRAND-BASED CANNABIS PROMOTIONAL OFFER BASED UPON MOBILE DEVICE LOCATION AND RELATED METHODS

(71) Applicant: INMAR CLEARING, INC., Winston-Salem, NC (US)

(72) Inventors: Jess D. Walker, Georgetown, TX (US); David Edward Johnson, Cedar Park, TX (US); Grazia Ruskin, Austin, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/046,557

(22) Filed: Jul. 26, 2018

Related U.S. Application Data

(63) Continuation-in-part of application No. 15/652,660, filed on Jul. 18, 2017, now Pat. No. 10,380,644.

(51) Int. Cl.
*G09G 5/00* (2006.01)
*G06Q 30/02* (2012.01)

(52) U.S. Cl.
CPC ..... *G06Q 30/0236* (2013.01); *G06Q 30/0238* (2013.01)

(58) Field of Classification Search
None
See application file for complete search history.

(56) References Cited

U.S. PATENT DOCUMENTS 6,333,752 B1 * 12/2001 Hasegawa ........... G06F 3/04845
345/581
7,595,796 B2 * 9/2009 Ranganathan ........ G06F 1/3215
345/214

(Continued)

OTHER PUBLICATIONS

Wells-Fargo Bank. Card Connect Credit Policy. (Mar. 4, 2015). Retrieved online Jan. 14, 2021. https://www.gosite.com/hubfs/Credit%20Policy.pdf (Year: 2015).*

(Continued)

*Primary Examiner* — James A Reagan
(74) *Attorney, Agent, or Firm* — Allen, Dyer, Doppelt + Gilchrist, P.A. Attorneys at Law (57) ABSTRACT

A system may include a promotions server for storing a brand-based *Cannabis* promotional offer and a mobile wireless communications device associated with a user. The system may also include a point-of-sale (POS) terminal located at a *Cannabis* serving establishment for acquiring user identification information, opening a user *Cannabis* tab and communicating the user identification information to the promotions server, and closing and communicating the user *Cannabis* tab to the promotions server. The user *Cannabis* tab may identify a brand of *Cannabis* ordered by the user. The promotions server may determine that the mobile device is at the *Cannabis* serving establishment and send a notification of the brand-based *Cannabis* promotional offer to the mobile device. The promotions server may also determine that the brand of *Cannabis* ordered by the user matches the brand-based *Cannabis* promotional offer and communicate the brand-based *Cannabis* promotional offer to the POS terminal for redemption thereat.

24 Claims, 5 Drawing Sheets

(56) References Cited

U.S. PATENT DOCUMENTS

| | | | |
|---|---|---|---|
| 8,400,370 B2* | 3/2013 | Yoshida | G06F 3/1446 345/1.3 |
| 9,392,239 B2* | 7/2016 | Asamura | H04N 9/3147 |
| 9,471,162 B2* | 10/2016 | Bae | G06F 3/041 |
| 9,659,304 B1* | 5/2017 | Toewe | G06Q 20/32 |
| 9,836,772 B1* | 12/2017 | Rosenfeld | G06Q 30/0607 |
| 2002/0054141 A1* | 5/2002 | Yen | G06F 3/0481 715/804 |
| 2002/0101396 A1* | 8/2002 | Huston | G09G 3/002 345/87 |
| 2005/0122479 A1* | 6/2005 | Mann | H04N 13/395 353/28 |
| 2007/0104392 A1* | 5/2007 | Huang | G06T 3/40 382/298 |
| 2009/0231361 A1* | 9/2009 | Schieltz | G06F 17/2223 345/636 |
| 2009/0289946 A1* | 11/2009 | Goodart | G06F 3/1438 345/520 |
| 2010/0185461 A1* | 7/2010 | Broeska | G16H 10/60 705/3 |
| 2011/0060636 A1* | 3/2011 | Grossman | G06Q 30/02 705/14.25 |
| 2012/0109368 A1* | 5/2012 | Canter | G06Q 30/0282 700/233 |
| 2012/0147036 A1* | 6/2012 | Yoshikawa | H04M 1/72527 345/629 |
| 2013/0127916 A1* | 5/2013 | Van Slembrouk | G06F 17/30905 345/660 |
| 2013/0250180 A1* | 9/2013 | Wang | H04N 5/44 348/720 |
| 2014/0006136 A1* | 1/2014 | Grigg | G06Q 30/0238 705/14.33 |
| 2014/0179231 A1* | 6/2014 | Charania | G07F 9/001 455/41.2 |
| 2014/0316875 A1* | 10/2014 | Tkachenko | G06Q 30/0224 705/14.25 |
| 2014/0379450 A1* | 12/2014 | Barbieri | G06Q 30/0207 705/14.25 |
| 2015/0187324 A1* | 7/2015 | Kim | G06F 3/1446 345/1.3 |
| 2016/0012465 A1* | 1/2016 | Sharp | G06Q 20/386 705/14.17 |
| 2016/0267250 A1* | 9/2016 | Reinheimer | G16H 20/10 |
| 2017/0017773 A1* | 1/2017 | Saribekyan | G06Q 30/0639 |
| 2017/0286965 A1* | 10/2017 | Erwin | G06Q 20/206 |
| 2017/0345247 A1* | 11/2017 | Torresani | G06Q 10/087 |

OTHER PUBLICATIONS

Pennsylvania Department of Health. Medical Marijuana Dispensary Permit Application. (Mar. 16, 2017). Retrieved online Jan. 14, 2021. http://www.health.state.pa.us/mmrtk/docs-dispensaries/D-4007-17_Redacted.pdf (Year: 2017).*

* cited by examiner

SYSTEM INCLUDING POINT-OF-SALE (POS) TERMINAL FOR REDEMPTION OF A BRAND-BASED CANNABIS PROMOTIONAL OFFER BASED UPON MOBILE DEVICE LOCATION AND RELATED METHODS

RELATED APPLICATIONS

This application is a continuation in part of prior filed co-pending U.S. application Ser. No. 15/652,660, filed Jul. 18, 2017, the entire contents of which is incorporated herein by reference in its entirety.

TECHNICAL FIELD

The present invention relates to the field of electronics, and more particularly, to the location-based processing of promotional offers and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A brand-based promotional offer system may include a promotions server configured to store at least one brand-based *Cannabis* promotional offer, and a mobile wireless communications device associated with a user. The brand-based promotional offer system may also include a point-of-sale (POS) terminal located at a *Cannabis* serving establishment and configured to acquire user identification information and open a user *Cannabis* tab and communicate the user identification information to the promotions server. The POS terminal may also be configured to close the user *Cannabis* tab and communicate the user *Cannabis* tab to the promotions server, the user *Cannabis* tab identifying a brand of *Cannabis* ordered by the user. The promotions server may be configured to determine that the mobile wireless communications device is at the *Cannabis* serving establishment, and send a notification of the at least one brand-based *Cannabis* promotional offer to the mobile wireless communications device. The promotions server may also be configured to determine that the brand of *Cannabis* ordered by the user matches the at least one brand-based *Cannabis* promotional offer, and communicate the at least one brand-based *Cannabis* promotional offer to the POS terminal for redemption thereat.

The POS terminal may include a POS device processor and a payment card reader coupled thereto. The POS device processor may be configured to open the user *Cannabis* tab based upon reading a payment card associated with the user via the payment card reader, for example. The promotions server may be configured to send the notification based upon reading the payment card.

The mobile wireless communications device may include a geographic position determining device and a mobile device processor cooperating therewith to communicate a geographic position of the mobile wireless communications device to the promotions server. The promotions server may be configured to determine that the mobile wireless communications device is at the *Cannabis* serving establishment based upon the geographic position, for example.

The user identification information may include at least one of a payment card identifier associated with the user, a name of the user, and a phone number associated with the user, for example. The POS terminal may be configured to acquire user identification information wirelessly from the mobile wireless communications device.

The mobile wireless communications device may include a display and a mobile device processor coupled thereto. The notification may be displayed on the display, for example.

The notification may include at least one of an application notification, a short message service (SMS) message, and an email, for example. The at least one brand-based *Cannabis* promotional offer may include a discount toward the brand of the *Cannabis* ordered by the user.

The user *Cannabis* tab may identify a value associated with the brand of the *Cannabis* ordered by the user, for example. The promotional offer server may be configured accept an order for the *Cannabis* ordered by the user based upon the at least one brand-based *Cannabis* promotional offer.

A method aspect is directed to a method of processing a brand-based promotional offer. The method may include using a promotions server including a memory and a processor coupled thereto to store in the memory at least one brand-based *Cannabis* promotional offer and determine that a mobile wireless communications device associated with a user is at the *Cannabis* serving establishment, and send a notification of the at least one brand-based *Cannabis* promotional offer to the mobile wireless communications device. The promotions server may also be used to determine that a brand of *Cannabis* ordered by the user matches the at least one brand-based *Cannabis* promotional offer, and communicate the at least one brand-based *Cannabis* promotional offer to a point-of-sale (POS) terminal for redemption thereat. The POS terminal may be located at a *Cannabis* serving establishment and configured to acquire user identification information, open a user *Cannabis* tab and communicate the user identification information to the promotions server, and close the user *Cannabis* tab and communicate the user *Cannabis* tab to the promotions server, the user *Cannabis* tab identifying the brand of *Cannabis* ordered by the user.

A non-transitory computer readable medium aspect is directed to a non-transitory computer readable medium that includes computer executable instructions for processing a brand-based *Cannabis* promotional offer that when executed by a processor cause the processor to perform operations. The operations may include storing in a memory coupled to the processor at least one brand-based *Cannabis* promotional offer. The operations may also include determining that a mobile wireless communications device associated with a user is at a *Cannabis* serving establishment, and sending a notification of the at least one brand-based *Cannabis* promotional offer to the mobile wireless communications device. The operations may further include determining that a brand of *Cannabis* ordered by the user matches the at least one brand-based *Cannabis* promotional offer, and communicating the at least one brand-based *Cannabis* promotional offer to a point-of-sale (POS) terminal for redemption thereat. The POS terminal may be located at the *Cannabis* serving establishment and configured to acquire user identification information, open a user *Cannabis* tab and communicate the user identification information to the promotions server, and close the user *Cannabis* tab and communicate the user *Cannabis* tab to the promotions server, and the user *Cannabis* tab may identify the brand of *Cannabis* ordered by the user.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in different embodiments.

Figure 1:
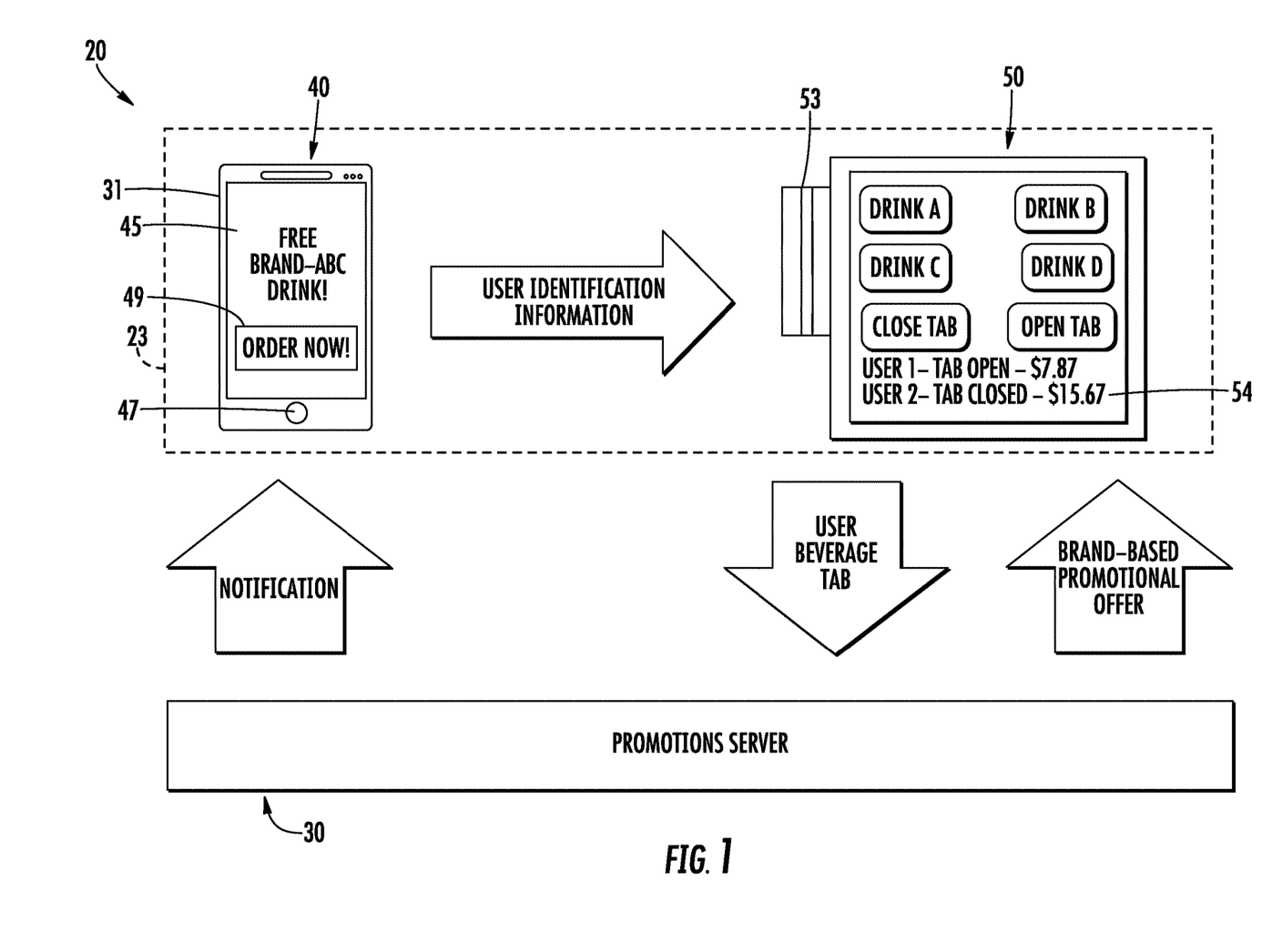
FIG. 1 is a schematic diagram of a brand-based promotional offer system in accordance with an embodiment.
Figure 2:
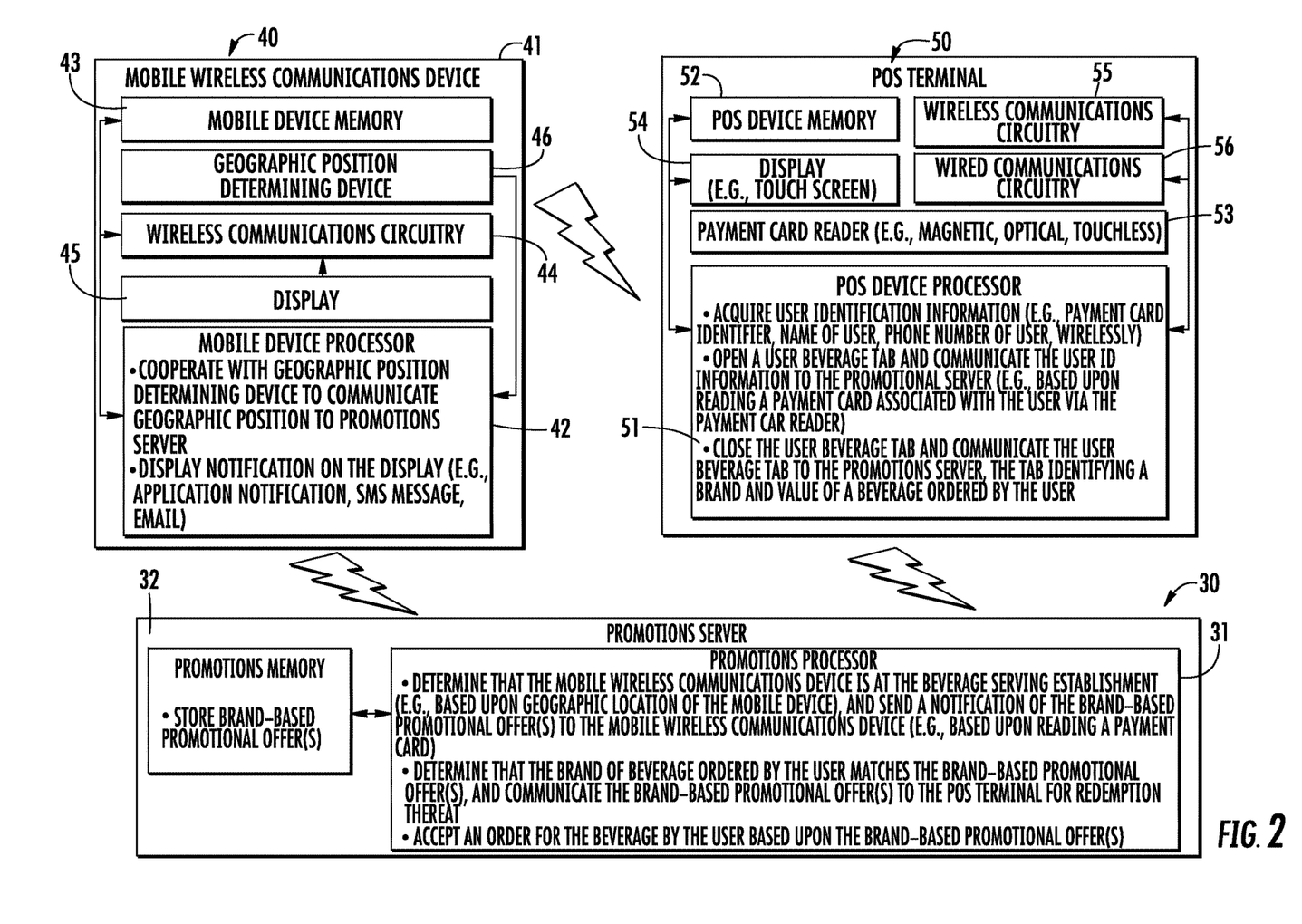
FIG. 2 is another schematic diagram of the brand-based promotional offer system of FIG. 1

Referring initially to FIGS. 1 and 2, a brand-based promotional offer system 20 includes a promotions server 30. The promotions server 30 includes a promotions processor 31 and a promotions memory 32 coupled to the promotions processor. The promotions memory 32 stores brand-based beverage promotional offers, for example, associated with a particular brand of adult beverage. Of course, the promotions memory 32 may store other brand-based beverage promotional offers, for example, for soft drinks, nutritional beverages, etc.

The brand-based promotional offer system 20 also includes a mobile wireless communications device 40 associated with a user. The mobile wireless communications device 40 illustratively includes a portable housing 41, a mobile device processor 42, a mobile device memory 43 coupled to the mobile device processor 41, and wireless communications circuitry 44 coupled to the mobile device processor. The mobile wireless communications device 40 also includes a display 45, such as, for example, a touch display, carried by the portable housing 41 and coupled to the mobile device processor 42. The mobile wireless communications device 40 may include one or more input devices 47 and other types of output devices.

The mobile wireless communications device 40 may also include a geographic position determining device 46 cooperating with the mobile device processor 42 to communicate a geographic position of the mobile wireless communications device to the promotions server 30. The geographic position determining device 46 may be a global positioning system (GPS) device. The mobile wireless communications device 40 may be a mobile phone or smartphone, a table computer, or other type of mobile wireless communications device, as will be appreciated by those skilled in the art.

The system 20 also includes a point-of-sale (POS) terminal 50 located at a beverage serving establishment 23. The POS terminal 50 may be remote from the promotions server 30, for example. The POS terminal 50 may include a POS device processor 51 and a POS device memory 52 coupled to the POS device processor. The POS terminal 50 may also include a payment card reader 53 coupled to the POS device processor 51. The payment card reader 53 may be a magnetic card reader, optical card reader, and/or a touchless, e.g., near-field communication (NFC), card reader. Of course, the payment card reader 53 may be another type of payment card reader.

The payment card reader 53 may cooperate with the POS device processor 51 to read, for example, a payment card via a swipe. A payment card may include a credit card, gift card, debit card, etc. The POS terminal 50 may also include a touch screen display 54 coupled to the POS device processor 51. In some embodiments, the POS terminal 50 may include a separate display and input device, i.e., not a touch screen display.

The POS terminal 50 may also include POS terminal wireless communications circuitry 55 coupled to the POS device processor 51 and cooperating therewith to communicate wirelessly with the mobile wireless communications device 40 via a communications network. The POS terminal 50 may also include wired communications circuitry 56 coupled to the POS device processor 51 and cooperating therewith to communicate, for example, with the promotions server 30, via the communications network, which may include the internet.

Figure 3:
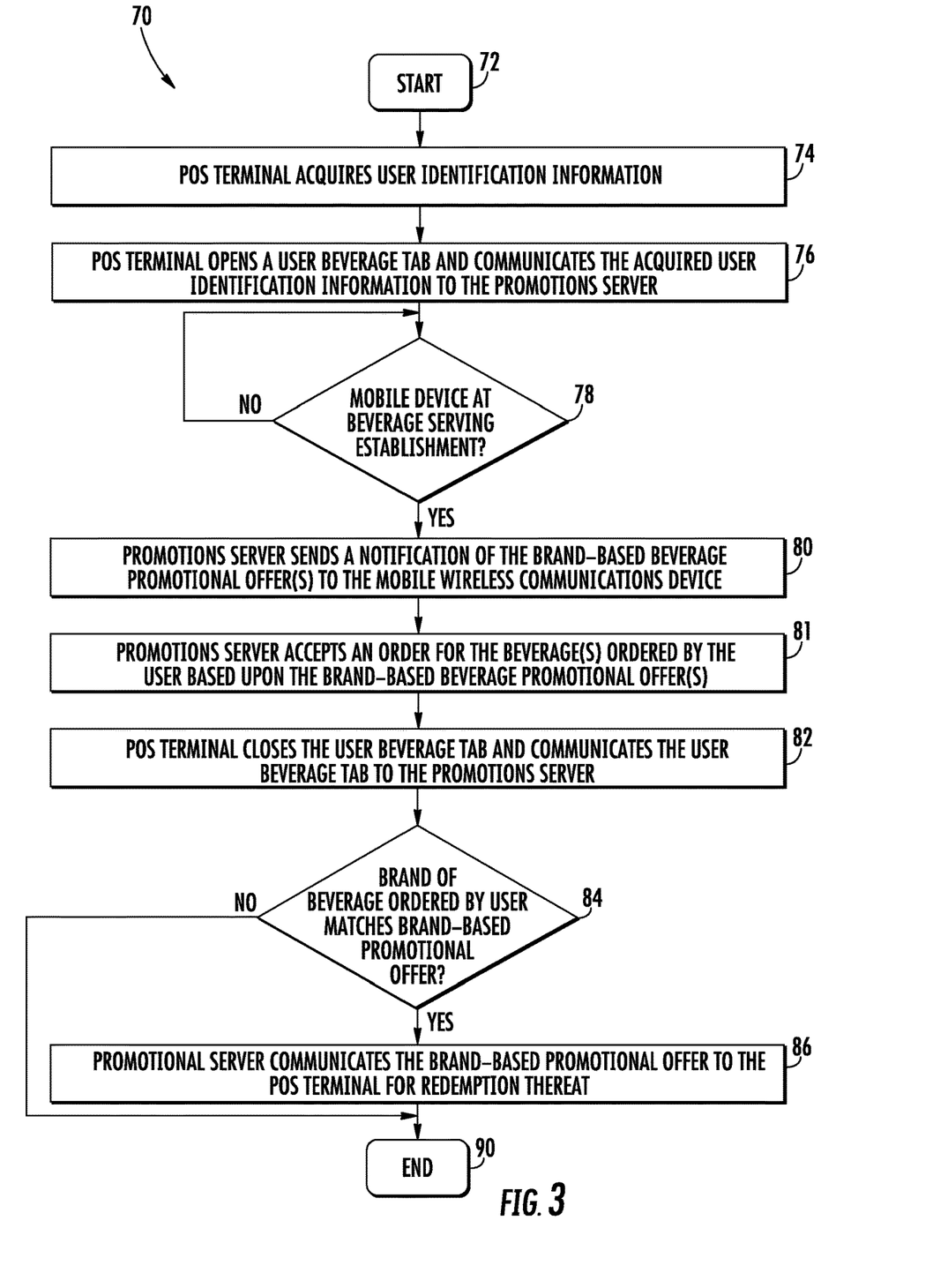
FIG. 3 is a flow chart of operation of the brand-based promotional offer system of FIG. 1.

Referring now additionally to the flowchart 70 in FIG. 3, and beginning at Block 72, operation of the brand-based promotional offer system 20 will now be described. The POS terminal 50 is configured to acquire user identification information (Block 74). The user identification information may include any one or more of a payment card identifier associated with the user (e.g., credit/debit card number), a name of the user, and a phone number associated with the user. The POS terminal 50 may acquire other and/or additional user identification information. The user identification information may be acquired, for example, wirelessly from the mobile wireless communications device 40, via the mobile device wireless communications circuitry 44 and the POS terminal wireless communications circuitry 55 (e.g., Bluetooth, NFC, etc.). The user identification information may be acquired by manual entry at the POS terminal 50 or by swiping of a payment card via the payment card reader 53, as will be appreciated by those skilled in the art.

At Block 76, the POS terminal 50 opens a user beverage tab and communicates the acquired user identification information to the promotions server 30. The POS device processor 51 may open the user beverage tab based upon reading the payment card associated with the user via the payment card reader 53. As will be appreciated by those skilled in the art, the user beverage tab may be opened and the user identification information acquired based upon the same reading or swiping of the payment card, for example. In some embodiments, the user information may be acquired and the user beverage tab opened in separate operations.

At block 78, the promotions server 30 determines that the mobile wireless communications device is at the beverage serving establishment 23 and sends a notification of the brand-based beverage promotional offers to the mobile wireless communications device 40 for display on the display 45 (Block 80). For example, the notification may be in the form of an in-application notification where an application on the mobile device cooperates to perform the functions described herein, a short message service (SMS) message, and/or an email. Of course, the notification may be another type of notification. The notification may notify the user of a "first drink on us" promotion good toward a beverage of the specified brand at the beverage serving establishment 23. The notification may notify the user of multiple brand-based promotions including the brand and value of the promotion. If, at Block 78, the mobile wireless communications device 40 is not at the beverage serving establishment 23, the promotions server 30 may poll for the location of the mobile wireless communications device, for example, so long as the corresponding application is running on the mobile wireless communications device.

The promotions server 30 may determine that the mobile wireless communications device 40 is at the beverage serving establishment 23 based upon the geographic position of the mobile wireless communications device 40. More particularly, the geographic position of the mobile wireless communications device 40 may be wirelessly communicated from the mobile wireless communications device to the promotions server 30 to determine whether the geographic position matches a beverage serving establishment 23 associated with or participating in one or more of the brand-based promotions. The promotions server 30 may alternatively or additionally determine that the mobile wireless communications device 40 is at the beverage serving establishment 23 based upon authentication or communication of the mobile wireless communications device with the POS terminal 50, which in turn may communicate this information and/or location determining information associated with the POS terminal to the promotions server. It should be understood that while operations are being described in a particular sequence, the operational sequence is not limited to that described herein. For example, the promotions server 30 may determine whether the mobile wireless communications device 40 is at the beverage serving establishment 23 on an on-going basis and/or before, after, or concurrently with the acquisition of user identification information.

In some embodiments, the notification may be optionally sent based upon reading of the payment card at the POS terminal 50. In other words, the notification may be sent when the mobile wireless communications device 40 is determined to be at the beverage serving establishment 23 and upon swiping of the payment card at the payment card reader 53, for example, to open the beverage tab.

In some embodiments, if, for example, a payment card associated with the user is swiped at the payment card reader 53, and the mobile wireless communications device 40 associated with the user is determined not to be at the beverage serving establishment 23, this may be indicative of potential fraud, and the promotions server 30 may send a notification for display on the mobile wireless communications device of the potential fraudulent use of the payment card along with the name and/or location of the beverage serving establishment. The promotions server 30 may also communicate with the POS terminal 50 and/or other payment processing servers to notify of the potential fraud and/or not permit the opening of the user beverage tab.

At Block 81, the promotions server 30 may accept an order for the beverage ordered by the user based upon the at least one brand-based beverage promotional offer. For example, an "order now" button 49 may be displayed on the display 45, and the user may provide input to the mobile wireless communications device 40 to place an order. The order may be communicated from the mobile wireless communications device 40 to the promotions server 30. Alternatively, the order may be placed at the POS terminal 50 and communicated to the promotions server 30.

At Block 82, the POS terminal 50 closes the user beverage tab and communicates the user beverage tab to the promotions server 30. The user beverage tab that is sent to the promotions server 30 includes or identifies the brand of each beverage ordered by the user and a corresponding value or dollar amount. The user beverage tab may be closed by manual entry via the POS terminal 50, the payment card reader 53, and/or through communications between the mobile wireless communications device 40 and the POS terminal, for example, using NFC.

At Block 84, the promotions server 30 determines that the brand of beverage ordered by the user, and included on their beverage tab, matches the brand-based beverage promotional offer, and communicates the brand-based beverage promotional offer or offers to the POS terminal 50 for redemption thereat (Block 86). Upon redemption, the brand-based beverage promotional offer is applied to the corresponding brand of beverage on the user beverage tab as a discount. The discount may correspond to the full or partial value of the beverage. In other words, the user's beverage tab is reduced by the value of the discount or promotional offer against the value of the corresponding beverage. If the user did not order or purchase the brand of beverage for the promotion (i.e., no match between the brand-based beverage promotional offer and the brand of beverage ordered by the user), no brand-based promotional offer is communicated to the POS terminal 50, and thus no discount is applied. In some embodiments, the closing of the user beverage tab may be time limited. In other words, the user may have a limited amount of time, for example, from notification, to redeem the brand-based beverage promotional offer. The method ends at Block 90.

A method of processing a brand-based beverage promotional offer that includes using a promotions server 30 that includes a memory 32 and a processor 31 coupled thereto to store in the memory at least one brand-based beverage promotional offer. The method also includes using the promotions server 30 to determine that a mobile wireless communications device 40 associated with a user is at a beverage serving establishment 23, and send a notification of the at least one brand-based beverage promotional offer to the mobile wireless communications device. The method also includes using the promotions server 30 to determine that a brand of beverage ordered by the user matches the at least one brand-based beverage promotional offer, and communicate the at least one brand-based beverage promotional offer to a point-of-sale (POS) terminal 50 for redemption thereat. The POS terminal 50 is located at the beverage serving establishment 23 and configured to acquire user identification information, open a user beverage tab and communicate the user identification information to the promotions server 30, and close the user beverage tab and communicate the user beverage tab to the promotions server, the user beverage tab identifying the brand of a beverage ordered by the user.

While circuitry and components of the embodiments have been described herein separately relative to their respective functions, it should be appreciated by those skilled in the art that the circuitry may be embodied on a single integrated circuit (IC) or circuit component, and/or combined into one or more ICs or circuit components. Moreover, the functions or operations described herein may be performed through the execution of computer executable instructions embodied on a computer readable medium. For example, a non-transitory computer readable medium may include computer executable instructions for processing a brand-based beverage promotional offer that when executed by a processor 31 cause the processor to perform operations. The operations may include storing in a memory 32 coupled to the processor at least one brand-based beverage promotional offer. The operations may also include determining that a mobile wireless communications device 40 associated with a user is at the beverage serving establishment 23, and sending a notification of the at least one brand-based beverage promotional offer to the mobile wireless communications device. The operations may further include determining that a brand of beverage ordered by the user matches the at least one brand-based beverage promotional offer, and communicating the at least one brand-based beverage promotional offer to a point-of-sale (POS) terminal 50 for redemption thereat. The POS terminal 50 may be located at the beverage serving establishment and configured to acquire user identification information, open a user beverage tab and communicate the user identification information to the promotions server, and close the user beverage tab and communicate the user beverage tab to the promotions server, and the user beverage tab may identify the brand of a beverage ordered by the user.

Figure 4:
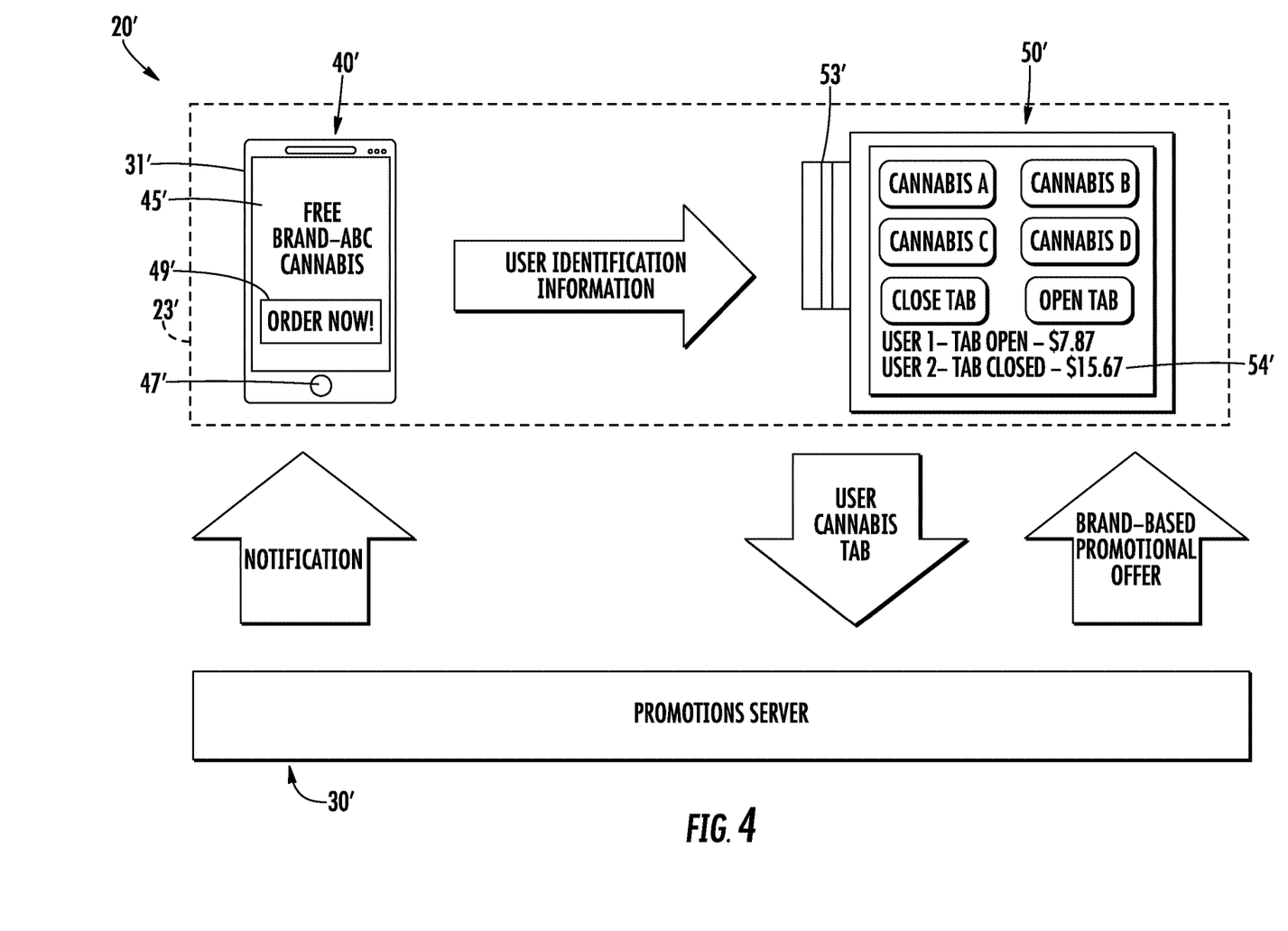
FIG. 4 is a schematic diagram of a brand-based promotional offer system in accordance with another embodiment.
Figure 5:
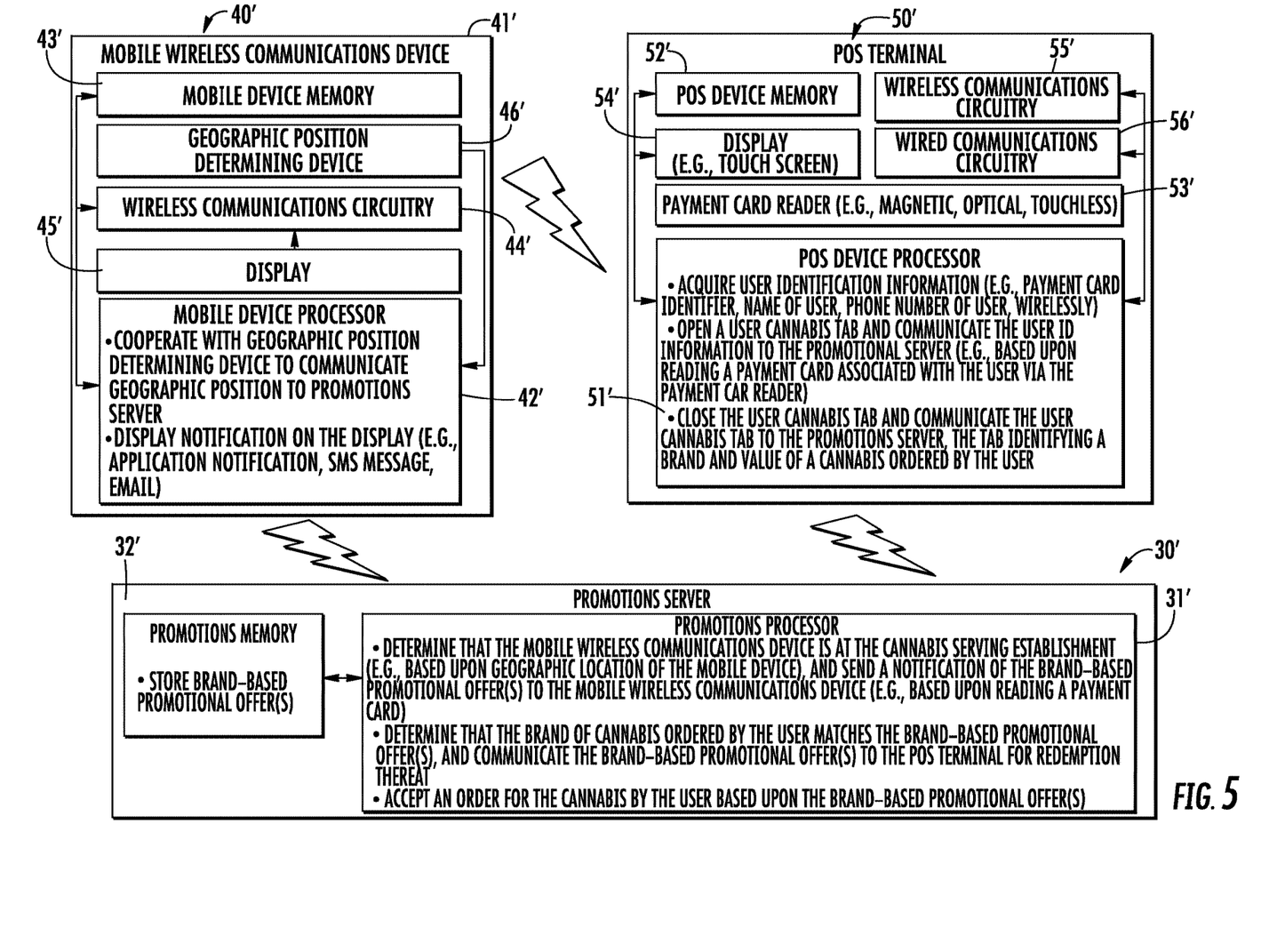
FIG. 5 is another schematic diagram of the brand-based promotional offer system of FIG. 4.

Referring now additionally to FIGS. 4 and 5, in another embodiment, instead of brand-based offers for beverages, the brand-based promotional offer system 20' may be applicable to *Cannabis*. For example, the POS terminal 50' may be located at a *Cannabis* serving establishment, such as, for example, a *Cannabis* dispensary, and the promotions server 30' may provide or communicate brand-based *Cannabis* promotional offers in accordance with the embodiments described above with respect to FIGS. 1-3. It should be understood by those skilled in the art that *Cannabis* as used herein includes all forms of *Cannabis* including but not limited to, processed, unprocessed, packaged, bulk, recreational, and/or medical, for example. Elements illustrated in FIGS. 4 and 5 are similar to those described above with respect to the embodiments in FIGS. 1-2 and need no further discussion herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A brand-based promotional offer system comprising:
   a promotions server configured to store at least one brand-based *Cannabis* promotional offer;
   a mobile wireless communications device associated with a user; and
   a point-of-sale (POS) terminal located at a *Cannabis* serving establishment and comprising a POS device processor and a payment card reader coupled thereto, the POS device processor configured to
      acquire user identification information,
      open a user *Cannabis* tab based upon reading a payment card associated with the user via said payment card reader and communicate the user identification information to said promotions server, and
      close the user *Cannabis* tab and communicate the user *Cannabis* tab to said promotions server, the user *Cannabis* tab identifying a brand of *Cannabis* ordered by the user;
   said promotions server configured to
      determine that said mobile wireless communications device is at the *Cannabis* serving establishment, and send a notification of the at least one brand-based *Cannabis* promotional offer to the mobile wireless communications device,
      cooperate with the mobile wireless communications device to accept an order for the brand of *Cannabis* ordered by the user based upon the at least one brand-based *Cannabis* promotional offer, and
      determine that the brand of *Cannabis* ordered by the user matches the at least one brand-based *Cannabis* promotional offer, and communicate the at least one brand-based *Cannabis* promotional offer to said POS terminal for redemption thereat.

2. The brand-based promotional offer system of claim 1 wherein said promotions server is configured to send the notification based upon reading the payment card.

3. The brand-based promotional offer system of claim 1 wherein said mobile wireless communications device comprises a geographic position determining device and a mobile device processor cooperating therewith to communicate a geographic position of said mobile wireless communications device to said promotions server.

4. The brand-based promotional offer system of claim 3 wherein said promotions server is configured to determine that said mobile wireless communications device is at the *Cannabis* serving establishment based upon the geographic position.

5. The brand-based promotional offer system of claim 1 wherein the user identification information comprises at least one of a payment card identifier associated with the user, a name of the user, and a phone number associated with the user.

6. The brand-based promotional offer system of claim 1 wherein said POS terminal is configured to acquire user identification information wirelessly from said mobile wireless communications device.

7. The brand-based promotional offer system of claim 1 wherein said mobile wireless communications device comprises a display and a mobile device processor coupled thereto; and wherein the notification is displayed on said display.

8. The brand-based promotional offer system of claim 1 wherein the notification comprises at least one of an application notification, a short message service (SMS) message, and an email.

9. The brand-based promotional offer system of claim 1 wherein the at least one brand-based *Cannabis* promotional offer comprises a discount toward the brand of the *Cannabis* ordered by the user.

10. The brand-based promotional offer system of claim 1 wherein the user *Cannabis* tab identifies a value associated with the brand of the *Cannabis* ordered by the user.

11. A promotions server comprising:
    a memory configured to store at least one brand-based *Cannabis* promotional offer; and
    a processor coupled to said memory and configured to determine that a mobile wireless communications device associated with a user is at the *Cannabis* serving establishment, and send a notification of the at least one brand-based *Cannabis* promotional offer to the mobile wireless communications device, cooperate with the mobile wireless communications device to accept an order for a brand of *Cannabis* by the user based upon the at least one brand-based *Cannabis* promotional offer, and determine that the brand of *Cannabis* ordered by the user matches the at least one brand-based *Cannabis* promotional offer, and communicate the at least one brand-based *Cannabis* promotional offer to a point-of-sale (POS) terminal for redemption thereat, the POS terminal being located at a *Cannabis* serving establishment and comprising a POS device processor and a payment card reader coupled thereto, the POS device processor configured to acquire user identification information, open a user *Cannabis* tab based upon reading a payment card associated with the user via the payment card reader and communicate the user identification information to the promotions server, and close the user *Cannabis* tab and communicate the user *Cannabis* tab to the promotions server, the user *Cannabis* tab identifying the brand of *Cannabis* ordered by the user.

12. The promotions server of claim 11 wherein the mobile wireless communications device comprises a geographic position determining device and a mobile device processor cooperating therewith to communicate a geographic position of the mobile wireless communications device to the promotions server; and wherein said processor is configured to determine that the mobile wireless communications device is at the *Cannabis* serving establishment based upon the geographic position.

13. The promotions server of claim 11 wherein the user identification information comprises at least one of a payment card identifier associated with the user, a name of the user, and a phone number associated with the user.

14. The promotions server of claim 11 wherein the notification comprises at least one of an application notification, a short message service (SMS) message, and an email.

15. The promotions server of claim 11 wherein the at least one brand-based *Cannabis* promotional offer comprises a discount toward the brand of the *Cannabis* ordered by the user.

16. A method of processing a brand-based *Cannabis* promotional offer comprising:

using a promotions server comprising a memory and a processor coupled thereto to store in the memory at least one brand-based *Cannabis* promotional offer, determine that a mobile wireless communications device associated with a user is at a *Cannabis* serving establishment, and send a notification of the at least one brand-based *Cannabis* promotional offer to the mobile wireless communications device, cooperate with the mobile wireless communications device to accept an order for a brand of *Cannabis* by the user based upon the at least one brand-based *Cannabis* promotional offer, and determine that the brand of *Cannabis* ordered by the user matches the at least one brand-based *Cannabis* promotional offer, and communicate the at least one brand-based *Cannabis* promotional offer to a point-of-sale (POS) terminal for redemption thereat, the POS terminal being located at the *Cannabis* serving establishment and comprising a POS device processor and a payment card reader coupled thereto, the POS device processor configured to acquire user identification information, open a user *Cannabis* tab based upon reading a payment card associated with the user via the payment card reader and communicate the user identification information to the promotions server, and close the user *Cannabis* tab and communicate the user *Cannabis* tab to the promotions server, the user *Cannabis* tab identifying the brand of *Cannabis* ordered by the user.

17. The method of claim 16 wherein the mobile wireless communications device comprises a geographic position determining device and a mobile device processor cooperating therewith to communicate a geographic position of the mobile wireless communications device to the promotions server; and wherein the promotions server is used to determine that the mobile wireless communications device is at the *Cannabis* serving establishment based upon the geographic position.

18. The method of claim 16 wherein the user identification information comprises at least one of a payment card identifier associated with the user, a name of the user, and a phone number associated with the user.

19. The method of claim 16 wherein the notification comprises at least one of an application notification, a short message service (SMS) message, and an email.

20. The method of claim 16 wherein the at least one brand-based *Cannabis* promotional offer comprises a discount toward the brand of the *Cannabis* ordered by the user.

21. A non-transitory computer readable medium comprising computer executable instructions for processing a brand-based *Cannabis* promotional offer that when executed by a processor cause the processor to perform operations comprising:

storing in a memory coupled to the processor at least one brand-based *Cannabis* promotional offer, determining that a mobile wireless communications device associated with a user is at a *Cannabis* serving establishment, and sending a notification of the at least one brand-based *Cannabis* promotional offer to the mobile wireless communications device, cooperating with the mobile wireless communications device to accept an order for a brand of *Cannabis* by the user based upon the at least one brand-based *Cannabis* promotional offer; and determining that the brand of *Cannabis* ordered by the user matches the at least one brand-based *Cannabis* promotional offer, and communicating the at least one brand-based *Cannabis* promotional offer to a point-of-sale (POS) terminal for redemption thereat, the POS terminal being located at the *Cannabis* serving establishment and comprising a POS device processor and a payment card reader coupled thereto, the POS device processor configured to acquire user identification information, open a user *Cannabis* tab based upon reading a payment card associated with the user via the payment card reader and communicate the user identification information to the promotions server, and close the user *Cannabis* tab and communicate the user *Cannabis* tab to the promotions server, the user *Cannabis* tab identifying the brand of *Cannabis* ordered by the user.

22. The non-transitory computer readable medium of claim 21 wherein the mobile wireless communications device comprises a geographic position determining device and a mobile device processor cooperating therewith to communicate a geographic position of the mobile wireless communications device to the promotions server; and wherein the computer executable instructions cause the processor to determine that the mobile wireless communications device is at the *Cannabis* serving establishment based upon the geographic position.

23. The non-transitory computer readable medium of claim 21 wherein the user identification information comprises at least one of a payment card identifier associated with the user, a name of the user, and a phone number associated with the user.

24. The non-transitory computer readable medium of claim 21 wherein the notification comprises at least one of an application notification, a short message service (SMS) message, and an email.

\* \* \* \* \*